United States Patent
Zhong et al.

(10) Patent No.: US 10,931,811 B2
(45) Date of Patent: Feb. 23, 2021

(54) METHOD AND SYSTEM FOR VERIFYING TRANSMISSION OF MULTIMEDIA MESSAGES

(71) Applicant: Alibaba Group Holding Limited, Grand Cayman (KY)

(72) Inventors: Haohua Zhong, Hangzhou (CN); Yuan Zhang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 211 days.

(21) Appl. No.: 15/494,299

(22) Filed: Apr. 21, 2017

(65) Prior Publication Data

US 2017/0310811 A1    Oct. 26, 2017

(30) Foreign Application Priority Data

Apr. 25, 2016 (CN) .......................... 201610262275.1

(51) Int. Cl.
*H04M 1/725* (2006.01)
*G06F 3/0488* (2013.01)
(Continued)

(52) U.S. Cl.
CPC ...... *H04M 1/72547* (2013.01); *G06F 3/0485* (2013.01); *G06F 3/0488* (2013.01);
(Continued)

(58) Field of Classification Search
CPC ......... H04M 1/72547; H04M 1/72583; H04M 1/04806; G06F 3/04817; G06F 3/0485;
(Continued)

(56) References Cited

U.S. PATENT DOCUMENTS 6,424,711 B1    7/2002  Bayless
7,035,923 B1    4/2006  Yoakum
(Continued)

FOREIGN PATENT DOCUMENTS

CN    101094233    12/2007
CN    103632332    3/2014
(Continued)

OTHER PUBLICATIONS

Gwynee, Guilford, "WeChat's little red envelopes are brilliant marketing for mobile payments," published on the internet at https://qz.com, on Jan. 29, 2014 (Year: 2014).
(Continued)

*Primary Examiner* — Ajay M Bhatia
*Assistant Examiner* — Phoebe X Pan
(74) *Attorney, Agent, or Firm* — Shun Yao; Park, Vaughan, Fleming & Dowler LLP

(57) ABSTRACT

Embodiments of the present invention provide a system for verifying sending of a voice or multimedia message. The system improves significantly over previous systems by preventing unwanted recording of messages, while also providing expedient user operation. A computing device receives a first trigger operation representing an instruction to generate a voice or multimedia message. The computing device records the voice or multimedia message, and receives a second trigger operation. In response to determining that the second trigger operation represents a send verification instruction, the device sends the voice or multimedia message to a second user or group. In response to determining that the second trigger operation represents a null instruction, the device cancels sending the voice or multimedia message.

20 Claims, 13 Drawing Sheets

(51) Int. Cl.
*G06F 3/0481* (2013.01)
*G06F 3/16* (2006.01)
*H04L 12/58* (2006.01)
*G06F 3/0486* (2013.01)
*G06F 3/0485* (2013.01)

(52) U.S. Cl.
CPC ...... *G06F 3/04817* (2013.01); *G06F 3/04883* (2013.01); *G06F 3/167* (2013.01); *H04L 51/10* (2013.01); *H04L 51/30* (2013.01); *H04M 1/72583* (2013.01); *G06F 3/0481* (2013.01); *G06F 3/0486* (2013.01); *G06F 3/04886* (2013.01); *G06F 2203/04806* (2013.01); *G06F 2203/04808* (2013.01); *H04L 51/04* (2013.01)

(58) Field of Classification Search
CPC .... G06F 3/0488; G06F 3/04883; G06F 3/167; G06F 2203/04806; G06F 2203/04808; H04L 51/10; H04L 51/30; H04L 51/04; H04L 51/043; H04L 51/32
See application file for complete search history.

(56) References Cited

U.S. PATENT DOCUMENTS

| | | | |
|---|---|---|---|
| 7,133,687 | B1 | 11/2006 | El-Fishawy |
| 7,159,191 | B2 | 1/2007 | Koivuniemi |
| 7,197,122 | B2* | 3/2007 | Vuori ................ H04M 1/7255 379/201.1 |
| 7,398,252 | B2 | 7/2008 | Neofytides |
| 7,603,413 | B1 | 10/2009 | Herold |
| 7,653,691 | B2* | 1/2010 | Lasensky .............. G06Q 10/06 709/206 |
| 7,669,134 | B1 | 2/2010 | Christie |
| 7,835,955 | B1 | 11/2010 | Brodsky |
| 8,165,609 | B2 | 4/2012 | Fang |
| 8,316,096 | B2 | 11/2012 | Svendsen |
| 8,352,341 | B1 | 1/2013 | Greenberg |
| 8,355,699 | B1 | 1/2013 | Lo |
| 8,548,865 | B1 | 10/2013 | Ho |
| 8,670,791 | B2 | 3/2014 | Ye |
| 8,768,310 | B1 | 7/2014 | Oroskar |
| 8,769,022 | B2 | 7/2014 | Tivyan |
| 8,788,602 | B1 | 7/2014 | Wan |
| 8,843,117 | B2 | 9/2014 | Sigmund |
| 8,856,244 | B2 | 10/2014 | Madnani |
| 8,880,725 | B2 | 11/2014 | Ananthanarayanan |
| 8,929,871 | B2 | 1/2015 | Bradburn |
| 8,968,103 | B2 | 3/2015 | Zhou |
| 9,021,040 | B1 | 4/2015 | Andrews |
| 9,117,197 | B1 | 8/2015 | Sharma |
| 9,143,477 | B2 | 9/2015 | Murthy |
| 9,185,062 | B1 | 11/2015 | Yang |
| 9,230,244 | B2 | 1/2016 | Patil |
| 9,253,639 | B1 | 2/2016 | Lafuente |
| 9,578,160 | B2* | 2/2017 | Kim ................ H04M 1/72583 |
| 9,800,525 | B1 | 10/2017 | Lerner |
| 10,021,203 | B2 | 7/2018 | Papakipos |
| 10,200,332 | B2 | 2/2019 | Wu |
| 10,417,037 | B2 | 9/2019 | Gruber |
| 2002/0016163 | A1 | 2/2002 | Burgan |
| 2002/0120453 | A1 | 8/2002 | Lee |
| 2003/0084109 | A1 | 5/2003 | Balluff |
| 2003/0135559 | A1 | 7/2003 | Bellotti |
| 2003/0154249 | A1 | 8/2003 | Crockett |
| 2004/0002932 | A1 | 1/2004 | Horvitz |
| 2004/0006599 | A1 | 1/2004 | Bates |
| 2004/0085360 | A1 | 5/2004 | Pratt |
| 2004/0102962 | A1 | 5/2004 | Wei |
| 2005/0149855 | A1 | 7/2005 | Loo |
| 2005/0177368 | A1 | 8/2005 | Odinak |
| 2006/0093142 | A1 | 5/2006 | Schneier |
| 2006/0229890 | A1 | 10/2006 | Sattler |
| 2007/0060193 | A1* | 3/2007 | Kim ................ H04M 1/72555 455/550.1 |
| 2007/0105572 | A1 | 5/2007 | Kim |
| 2007/0123223 | A1 | 5/2007 | Letourneau |
| 2007/0233801 | A1* | 10/2007 | Eren ................ G06Q 10/107 709/207 |
| 2007/0299565 | A1 | 12/2007 | Oesterling |
| 2008/0112596 | A1 | 5/2008 | Rhoads |
| 2008/0114776 | A1 | 5/2008 | Sun |
| 2008/0168361 | A1 | 7/2008 | Forstall |
| 2008/0168379 | A1 | 7/2008 | Forstall |
| 2008/0307040 | A1 | 12/2008 | So |
| 2008/0307094 | A1 | 12/2008 | Karonen |
| 2009/0018903 | A1 | 1/2009 | Iyer |
| 2009/0240497 | A1 | 9/2009 | Usher |
| 2009/0287776 | A1 | 11/2009 | Corry |
| 2010/0004971 | A1 | 1/2010 | Lee |
| 2010/0005402 | A1 | 1/2010 | George |
| 2010/0017481 | A1 | 1/2010 | Chen |
| 2010/0023341 | A1 | 1/2010 | Ledbetter |
| 2010/0056109 | A1* | 3/2010 | Wilson ............... H04L 12/1827 455/412.1 |
| 2010/0105362 | A1 | 4/2010 | Yang |
| 2010/0205541 | A1 | 8/2010 | Rapaport |
| 2010/0216448 | A1* | 8/2010 | Jeon ................ G06F 3/04817 455/418 |
| 2010/0257490 | A1* | 10/2010 | Lyon ................ G06F 3/0488 715/863 |
| 2010/0323752 | A1 | 12/2010 | Park |
| 2011/0019662 | A1* | 1/2011 | Katis ................ H04L 12/1831 370/352 |
| 2011/0035687 | A1* | 2/2011 | Katis ................ H04L 12/1827 715/758 |
| 2011/0136431 | A1 | 6/2011 | Haaramo |
| 2011/0145823 | A1 | 6/2011 | Rowe |
| 2011/0173041 | A1 | 7/2011 | Breitenbach |
| 2011/0173548 | A1 | 7/2011 | Madnani |
| 2011/0243113 | A1 | 10/2011 | Hjelm |
| 2011/0258559 | A1* | 10/2011 | You ................ H04M 1/72552 715/752 |
| 2011/0313803 | A1 | 12/2011 | Friend |
| 2011/0314402 | A1 | 12/2011 | Kikin-Gil |
| 2012/0030301 | A1 | 2/2012 | Herold |
| 2012/0046077 | A1* | 2/2012 | Kim ................ H04M 1/72577 455/566 |
| 2012/0059842 | A1 | 3/2012 | Hille-Doering |
| 2012/0084308 | A1* | 4/2012 | Kang ................ G06F 16/40 707/758 |
| 2012/0108268 | A1 | 5/2012 | Lau |
| 2012/0185547 | A1 | 7/2012 | Hugg |
| 2012/0290950 | A1 | 11/2012 | Rapaport |
| 2012/0311585 | A1 | 12/2012 | Gruber |
| 2013/0069969 | A1* | 3/2013 | Chang ............... H04M 1/72552 345/589 |
| 2013/0080580 | A1 | 3/2013 | Nagai |
| 2013/0086071 | A1 | 4/2013 | Riedel |
| 2013/0133055 | A1 | 5/2013 | Ali |
| 2013/0138726 | A1 | 5/2013 | Shin |
| 2013/0144702 | A1 | 6/2013 | Tabor |
| 2013/0173723 | A1 | 7/2013 | Herold |
| 2013/0227029 | A1 | 8/2013 | Hymel |
| 2013/0227041 | A1 | 8/2013 | Rideout |
| 2013/0268418 | A1 | 10/2013 | Sardi |
| 2013/0268765 | A1 | 10/2013 | Kent, Jr. |
| 2013/0275164 | A1 | 10/2013 | Gruber |
| 2013/0297493 | A1 | 11/2013 | Linden |
| 2013/0298006 | A1 | 11/2013 | Good |
| 2013/0311920 | A1 | 11/2013 | Koo |
| 2013/0332162 | A1 | 12/2013 | Keen |
| 2013/0332307 | A1 | 12/2013 | Linden |
| 2014/0025546 | A1 | 1/2014 | Seng |
| 2014/0035956 | A1 | 2/2014 | Hay |
| 2014/0070945 | A1 | 3/2014 | Dave |
| 2014/0074483 | A1 | 3/2014 | Van Os |
| 2014/0085487 | A1* | 3/2014 | Park ................ H04N 5/23293 348/207.1 |
| 2014/0101263 | A1 | 4/2014 | Wu |
| 2014/0164073 | A1 | 6/2014 | Mosley |
| 2014/0184544 | A1* | 7/2014 | Lim ................ H04L 51/066 345/173 |

(56) References Cited

U.S. PATENT DOCUMENTS

| | | |
|---|---|---|
| 2014/0191986 A1 | 7/2014 | Kim |
| 2014/0207659 A1 | 7/2014 | Erez |
| 2014/0213318 A1 | 7/2014 | Leem |
| 2014/0279315 A1 | 9/2014 | Courter |
| 2014/0280615 A1 | 9/2014 | Burlin |
| 2014/0297348 A1 | 10/2014 | Ellis |
| 2014/0331150 A1 | 11/2014 | Griffin |
| 2014/0372516 A1 | 12/2014 | Watte |
| 2015/0039708 A1 | 2/2015 | Liu |
| 2015/0081486 A1 | 3/2015 | Niazi |
| 2015/0135046 A1 | 5/2015 | Moore |
| 2015/0170104 A1 | 6/2015 | Yamada |
| 2015/0207926 A1 | 7/2015 | Brown |
| 2015/0256353 A1 | 9/2015 | Busey |
| 2015/0264303 A1 | 9/2015 | Chastney |
| 2015/0296450 A1 | 10/2015 | Koo |
| 2015/0310567 A1 | 10/2015 | Wu |
| 2015/0317590 A1 | 11/2015 | Karlson |
| 2015/0346821 A1 | 12/2015 | Ichimura |
| 2015/0350130 A1* | 12/2015 | Yang .................. H04L 51/046 715/752 |
| 2015/0350225 A1 | 12/2015 | Perold |
| 2016/0048288 A1* | 2/2016 | Lee .................... G06F 3/0486 455/566 |
| 2016/0055215 A1 | 2/2016 | Kauwe |
| 2016/0062574 A1* | 3/2016 | Anzures ................ H04L 51/10 715/739 |
| 2016/0094509 A1 | 3/2016 | Ye |
| 2016/0125363 A1 | 5/2016 | Hung |
| 2016/0132971 A1 | 5/2016 | Teh |
| 2016/0180845 A1* | 6/2016 | Kim .................. H04M 1/72555 348/211.2 |
| 2016/0202889 A1* | 7/2016 | Shin .................. G06F 3/04847 715/758 |
| 2016/0205049 A1* | 7/2016 | Kim .................... G06F 3/0488 455/414.1 |
| 2016/0227019 A1* | 8/2016 | Seol .................. H04M 1/72552 |
| 2016/0242007 A1 | 8/2016 | Mihara |
| 2016/0330163 A1 | 11/2016 | Le Gall |
| 2017/0041255 A1 | 2/2017 | Dong |
| 2017/0118147 A1 | 4/2017 | Dold |
| 2017/0142212 A1 | 5/2017 | Bifulco |
| 2017/0171135 A1* | 6/2017 | Wu .......................... G08B 6/00 |
| 2017/0185930 A1 | 6/2017 | Perry |
| 2017/0185965 A1 | 6/2017 | Nishizawa |
| 2017/0228699 A1 | 8/2017 | Pang |
| 2017/0250937 A1* | 8/2017 | Chien .................. H04L 51/046 |
| 2017/0300537 A1* | 10/2017 | Kim .................... G06F 16/248 |
| 2018/0088784 A1* | 3/2018 | Zhu .................... G06F 3/04842 |
| 2019/0012527 A1* | 1/2019 | Wang ................ G06K 9/00281 |
| 2019/0014070 A1 | 1/2019 | Mertvetsov |

FOREIGN PATENT DOCUMENTS

| | | |
|---|---|---|
| CN | 105282328 | 1/2016 |
| CN | 105306600 | 2/2016 |
| JP | 2011059811 | 3/2011 |
| JP | 2011517380 | 6/2011 |
| JP | 2014106592 | 6/2014 |
| JP | 2014115716 | 6/2014 |
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |
| WO | 2015113458 | 8/2015 |
| WO | 2016016248 | 2/2016 |
| WO | 2016050146 | 4/2016 |
| WO | 2016054629 | 4/2016 |

OTHER PUBLICATIONS

Anonymous, "Crowdsource Your Company's Bonuses," I Done This Blog, www.blog.idonethis.com, May 30, 2012 (Year:2012).

Hao Yunhong, Qian Chen, "Decentralization and Compensation Reforms in China: The Case of Xiaoshan InterTrade," 2008 ISECS International Colloquium on Computing, Communication, Control and Management, IEEE Computer Society (Year: 2008).

Ozimec et al., "Moticational Inventives for developing salesforce performance in emerging markets," University of Zagreb, Croatia, IEEE (Year: 2011).

"Managing Activities with TVACTA: TaskVista and Activity-Centered Task Assistant", V Bellotti, JD Thornton-Proc. sigir Workshop on PIM, 2006 academia.edu (Year:2006).

* cited by examiner

ME THOD AND SYSTEM FOR VERIFYING TRANSMISSION OF MULTIMEDIA MESSAGES

RELATED APPLICATION

Under 35 U.S.C. § 119, this application claims the benefit and right of priority of Chinese Patent Application No. 201610262275.1, filed 25 Apr. 2016, the disclosure of which is incorporated by reference herein. This application is related to U.S. patent application Ser. No. 15/179,592, entitled "METHOD AND APPARATUS FOR ACTIVATING APPLICATION FUNCTION" filed Jun. 10, 2016, which is incorporated herein by reference.

BACKGROUND

Field

The present disclosure relates to the field of communication technologies. More specifically, the present disclosure is related to a method and system for verifying transmission of multimedia messages.

Related Art

Various messaging applications, such as mobile instant messaging (IM) applications, have become ubiquitous in users' daily lives. Users can edit and transmit text messages via these applications, making their communications with one another cheaper, easier, and faster.

However, composing text messages can take considerable time. Moreover, spelling, typographical, or grammatical mistakes can occur, which can prompt repeated corrections by the sender, and frustrate the recipient. As a result, messaging applications often provide functions for sending voice, video, and multimedia messages, so users can communicate without having to type messages manually. However, such multimedia messaging functionality can also carry the risk of unintentionally recording or transmitting messages, increasing the potential for mistakes, miscommunication, and embarrassment.

SUMMARY

A system and method are provided for verifying sending of a voice or multimedia message. During operation, the system receives a first predefined trigger operation representing an instruction to generate a voice or multimedia message. The system then records the voice or multimedia message. The system receives a second predefined trigger operation. In response to determining that the second predefined trigger operation represents a verification instruction to send the voice or multimedia message, the system sends the voice or multimedia message to a second user or group. In response to determining that the second predefined trigger operation represents a null instruction, the system cancels sending of the voice or multimedia message.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention solve the problem of inadvertent recording of voice or multimedia messages by facilitating dependable yet expedient verification by a user. The system improves significantly over previous systems by providing more reliable user operation, while providing efficiency and simplicity of use. The system can record and send a voice or multimedia message to a target recipient, subject to a sender's explicit verification. The system gives the sender sufficient opportunity to cancel these operations, hence avoiding unwanted and accidental recording or transmission of messages.

Recording and Transmission of Voice or Multimedia Messages

Figure 1A:
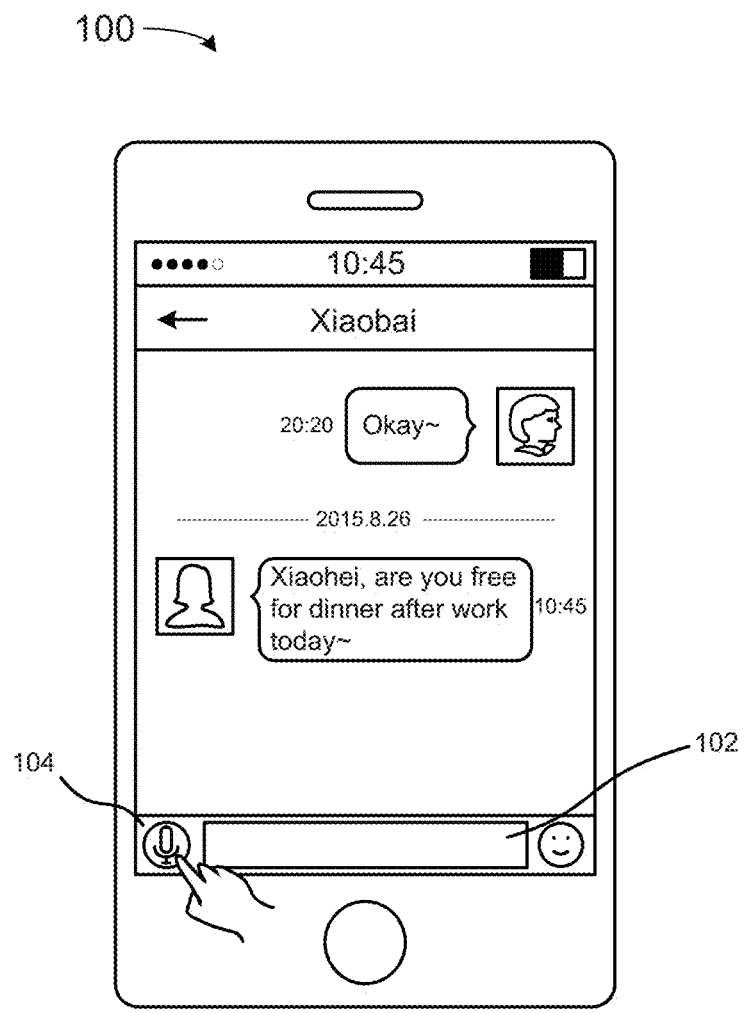
FIG. 1A illustrates a communication session window in an exemplary messaging application.

FIG. 1A illustrates a communication session window 100 in an exemplary messaging application. As shown in FIG. 1A, two users Xiaohei and Xiaobai can exchange messages in a communication session. Xiaohei can enter text directly via input box 102 at the bottom of the session window. Xiaohei can also tap on microphone icon 104, next to input box 102, to initiate the voice or multimedia message function.

Figure 1B:
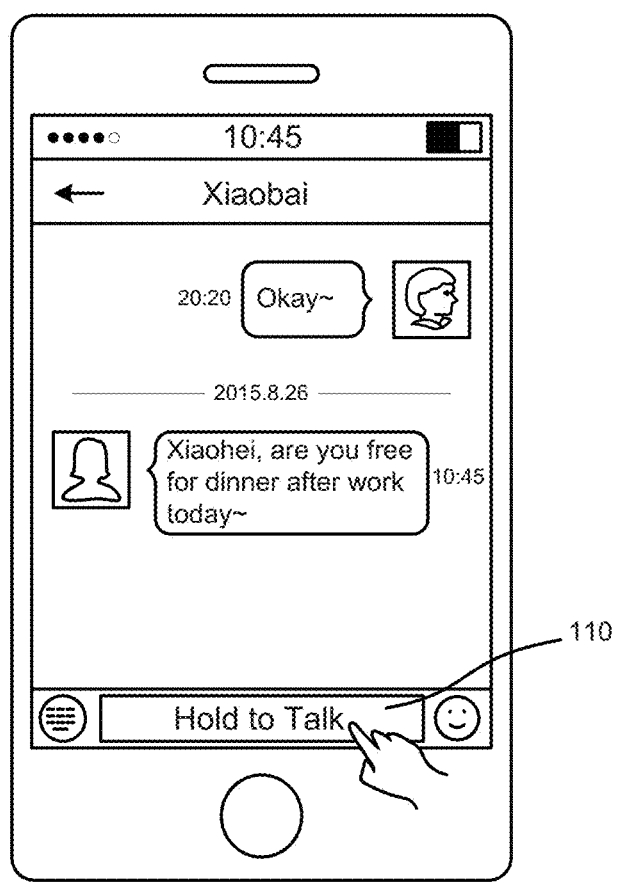
FIG. 1B illustrates recording a voice or multimedia message via an exemplary messaging application.

FIG. 1B illustrates recording a voice or multimedia message via an exemplary messaging application. When Xiaohei presses microphone icon 104, the messaging application's user interface may display a voice or multimedia acquisition layout, such that input box 102 converts to a voice acquisition function button 110. A notification, such as "hold to talk," can display on button 110, prompting Xiaohei to record a message.

Figure 1C:
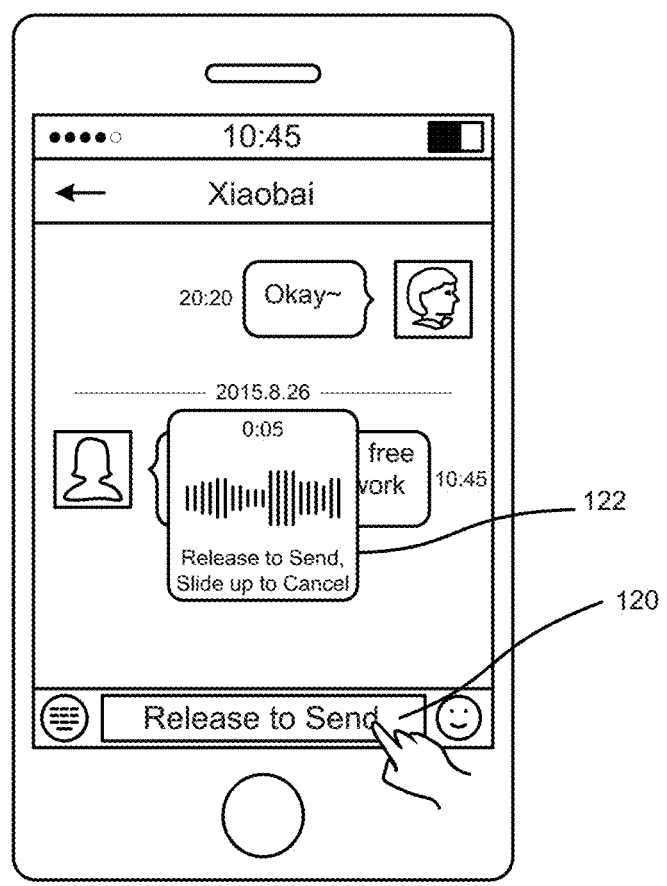
FIG. 1C illustrates an exemplary window for verifying sending of a voice or multimedia message.

FIG. 1C illustrates an exemplary window for verifying sending of a voice or multimedia message. When Xiaohei presses voice acquisition button 110, the communication session window may convert to the layout shown in FIG. 1C, and recording can begin. Moreover, notification 120 such as "release to send" or "slide up to cancel" and timing information, such as "0:05" and indicative voice waveform 122 can inform Xiaohei that a voice or multimedia message is being acquired.

If Xiaohei has used the voice acquisition function recently, Xiaohei's mobile interface can remain in the voice acquisition layout as shown in FIG. 1B, and recording may falsely trigger if Xiaohei accidentally taps button 110. Furthermore, if Xiaohei records a voice message without realizing, Xiaohei might not be able to prevent transmission of the message by performing an active cancellation gesture, such as "sliding up."

Figure 2A:
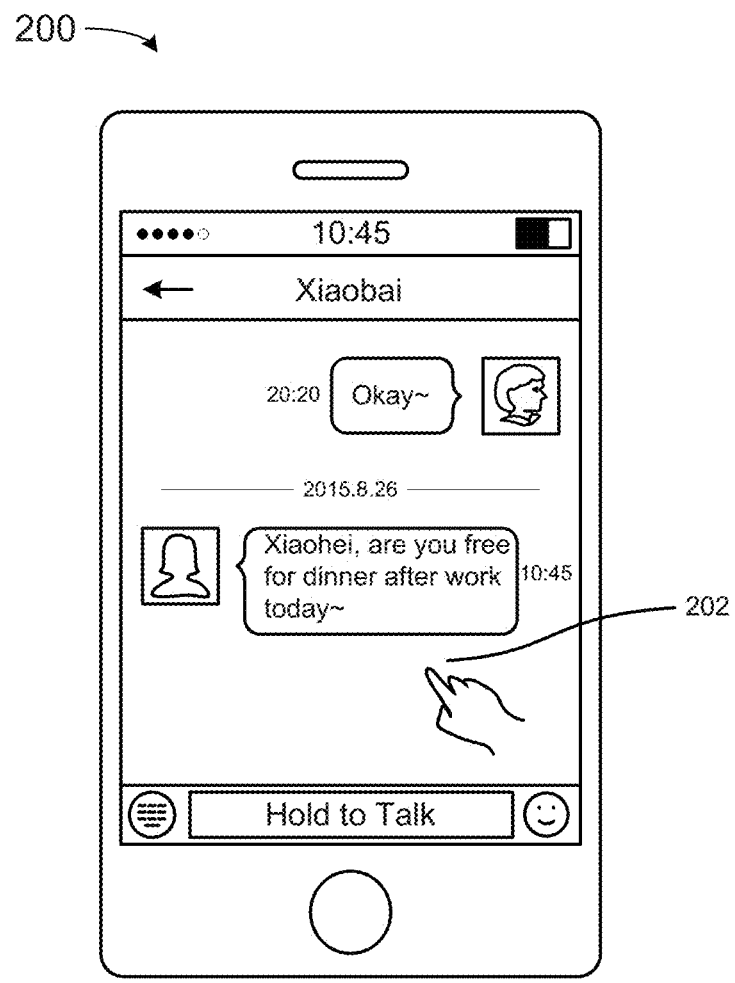
FIG. 2A illustrates triggering recording of a voice or multimedia message by long-pressing an empty region of a communication session window.
Figure 2B:
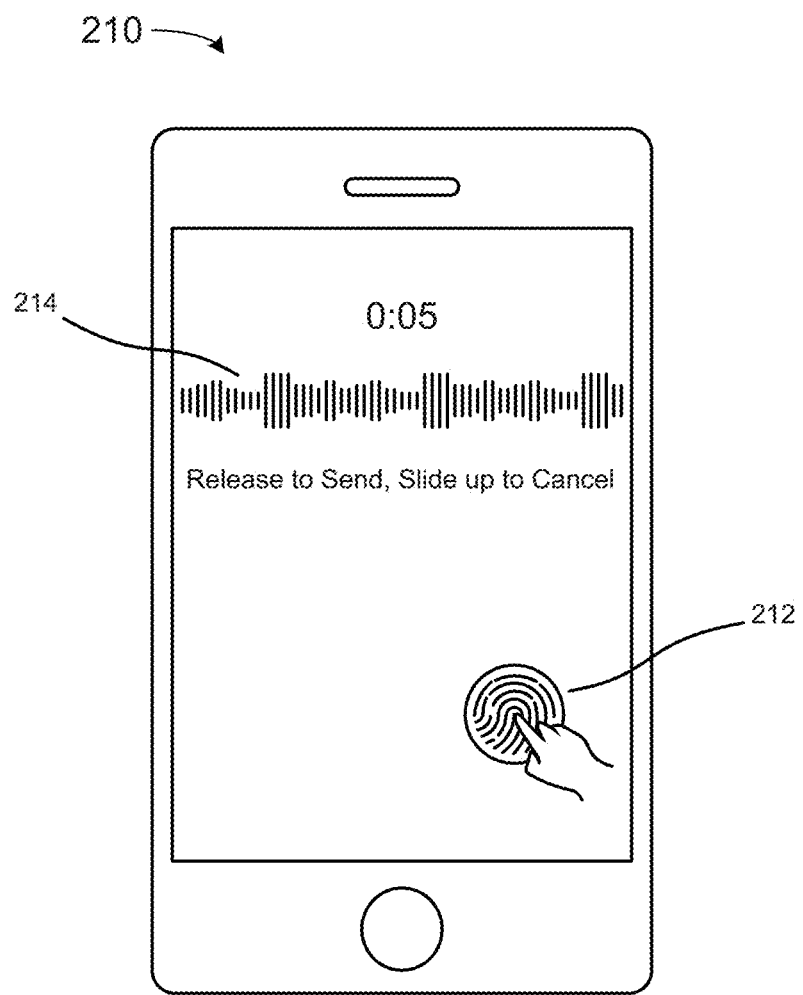
FIG. 2B illustrates an exemplary page for recording, and verifying sending of, a voice or multimedia message.

Meanwhile, some applications provide more convenient voice input functions. FIG. 2A illustrates triggering recording of a voice or multimedia message by press-and-holding an empty region of a communication session window 200. As shown in FIG. 2A, Xiaohei can press-and-hold empty region 202 of session window 200 to initiate recording. Triggering an application function by press-and-holding an empty space is described further in U.S. patent application Ser. No. 15/179,592, entitled "METHOD AND APPARATUS FOR ACTIVATING APPLICATION FUNCTION" filed Jun. 10, 2016, which is incorporated herein by reference. FIG. 2B illustrates an exemplary page 210 for recording and verifying transmission of a voice or multimedia message. After Xiaohei press-and-holds region 202, the user interface displays to a multimedia acquisition page as shown in FIG. 2B. Xiaohei's device can then initiate recording of the voice message. Acquisition page 210 may include a preset icon 212 and exemplary voice waveform and timing information 214 to inform Xiaohei that the voice message is being acquired. Information 214 may also include operational instructions regarding the use of icon 212, such as "release to send, slide up to cancel."

However, in the scenario shown in FIG. 2A, Xiaohei could press empty region 202 inadvertently. In particular, region 202 is part of this application's standard communication session view 200. If region 202 occupies a large display area of window 200, it could be more likely than in the scenario of FIG. 1B for Xiaohei to trigger media acquisition inadvertently. If Xiaohei triggered media acquisition by pressing region 202 without knowledge, Xiaohei typically is not able to prevent transmission of the message by an active cancellation gesture, such as "sliding up."

Verifying Sending of a Voice or Multimedia Message

Figure 3:
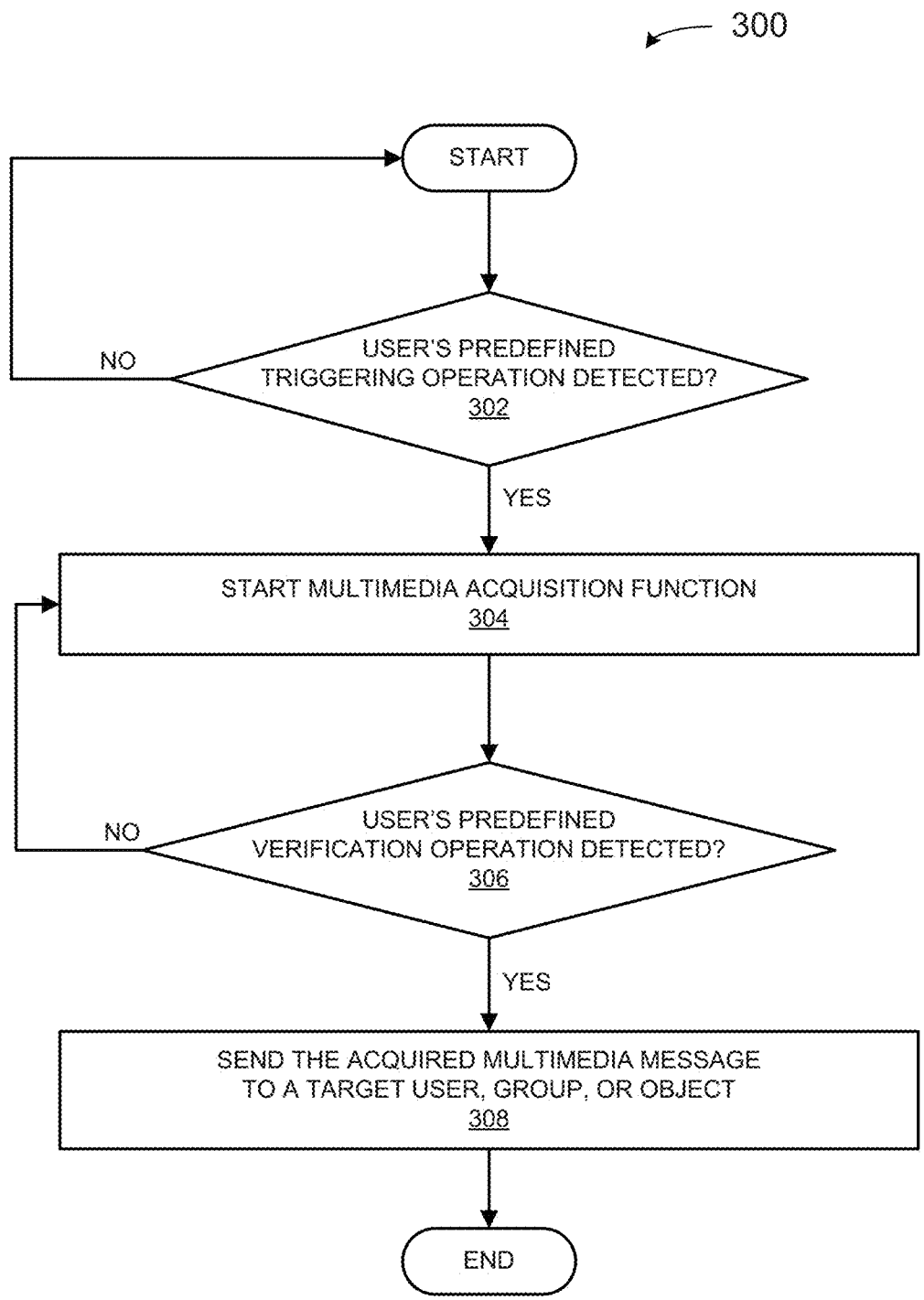
FIG. 3 presents a flowchart illustrating a method for verifying sending of a voice or multimedia message, in accordance with an embodiment of the present invention.

FIG. 3 presents a flowchart illustrating a method 300 for verifying sending of a voice or multimedia message, in accordance with an embodiment of the present invention. Method 300 can be performed by devices running a messaging application, for example an instant messaging (IM) or enterprise instant messaging (EIM) application. One such EIM application is "DingTalk."

During operation, the system checks whether a user's predefined triggering operation is detected (operation 302). The triggering operation represents an instruction by the user to generate a voice or multimedia message. In some embodiments, the user's predefined triggering operation can include a touch operation or gesture of the user, such as those listed in Table 1. In some embodiments, the system can allow the user to select the predefined triggering operation from a menu of such possibilities.

TABLE 1

| Touch operations or gestures |
|---|
| Tap or press |
| Two-finger tap |
| Long-press |
| Finger release |
| Sliding |
| Dragging |
| Dragging to a target location |
| Thumb trace or arc |
| Pinch gesture |
| Pan gesture |
| Zoom gesture |

Responsive to detecting the predefined triggering operation, the system starts the voice, video, or multimedia acquisition function (operation 304). For example, the user's mobile device may record voice using a built-in microphone, and may also record video using a built-in camera. The multimedia acquisition function can also be used for generating any other type of multimedia message, which is not limited by the present disclosure. The system can display a media acquisition screen or dialog, with a message such as "slide to finish recording." As described further below, the acquisition screen or dialog can include a preset icon and/or a target for dragging. In some embodiments, the system may use an auxiliary voice or vibration prompt to inform the user when the voice or multimedia input function starts and/or ends.

Next, the system checks whether a user's predefined verification operation is detected (operation 306). The verification operation represents a confirmation instruction by the user to complete recording and/or to send the message. Responsive to detecting the predefined verification operation to confirm sending, the system then sends the acquired voice, video, or multimedia message (operation 308). Alternatively, the verification operation could instead receive a nullification instruction by the user to cancel sending and/or recording, or to redo the recording, of the message. After detecting such a nullification instruction, the system can cancel sending of the voice or multimedia message.

The user's predefined verification operation may include a second touch operation or gesture of the user, such as one of those listed in Table 1. The system may also allow the user to select the predefined verification operation from a menu of possibilities. In some embodiments, the second touch operation is continuous with the first touch operation. That is, the system can allow the user to perform both the first touch operation, indicative of an instruction to record the message, and the second touch operation, indicative of a confirmation instruction, continuously without lifting his or her finger. For example, suppose the first touch operation involves a tap, press, or long-press, and the second touch operation involves a sliding or dragging motion. Then these two operations represent distinct instructions, yet can be performed continuously.

User Verification Based on Dragging a Preset Icon

As mentioned above, the multimedia message acquisition screen can include a preset icon and/or a target for dragging. By making use of such a preset icon (by contrast with a configuration based on "release to send"), the system can improve reliability and minimize the chance of inadvertent transmission.

Figure 4:
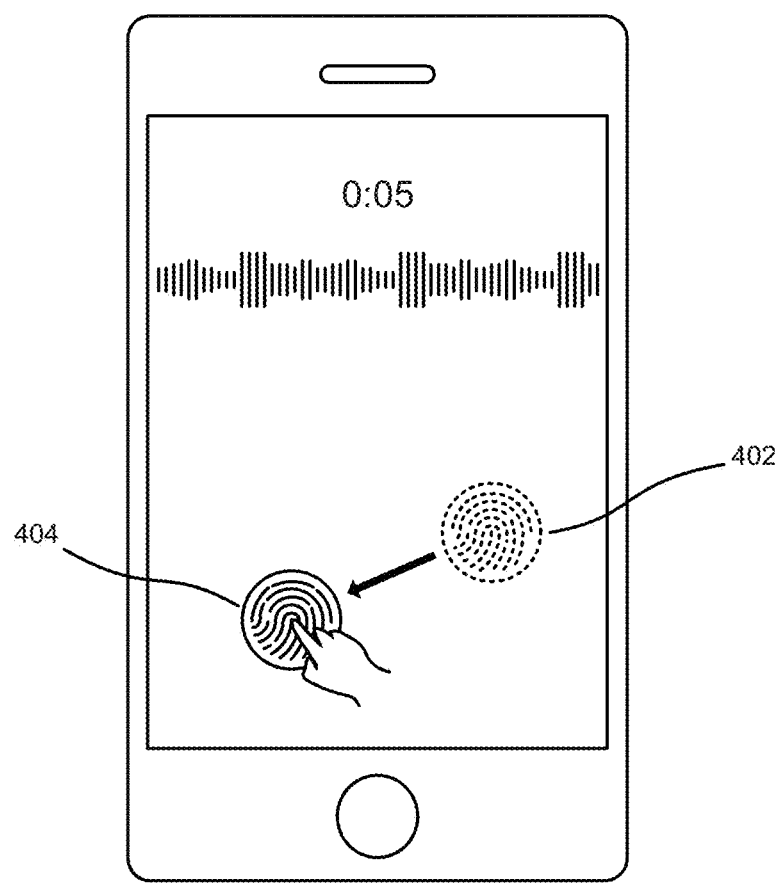
FIG. 4 illustrates an exemplary user verification operation based on dragging a preset icon, in accordance with an embodiment of the present invention.

FIG. 4 illustrates an exemplary user verification operation based on dragging a preset icon, in accordance with an embodiment of the present invention. If the system shows a preset icon 402 on the voice or multimedia message acquisition page, icon 402 can additionally serve as a notification that recording has been activated, i.e. that voice or multimedia acquisition is in the "active" state. To prompt the user to press icon 402, the system may display icon 402 as a fingerprint or similar pattern. The user's verification operation can include dragging icon 402 by a minimum threshold distance (e.g. to location 404), in a particular direction, or to a preset trigger area. In some embodiments, the system can determine whether the user successfully moves an icon object such as 402 from a first position to a second position, such as location 404, in order to satisfy the user verification operation. In one embodiment, the system can impose a specific condition for the user's verification. For example, the user can be required to drag icon 402 to satisfy such conditions, which confirms the user's will, so the system can appropriately cancel accidental touching operations that might transmit the message by mistake.

Figure 5:
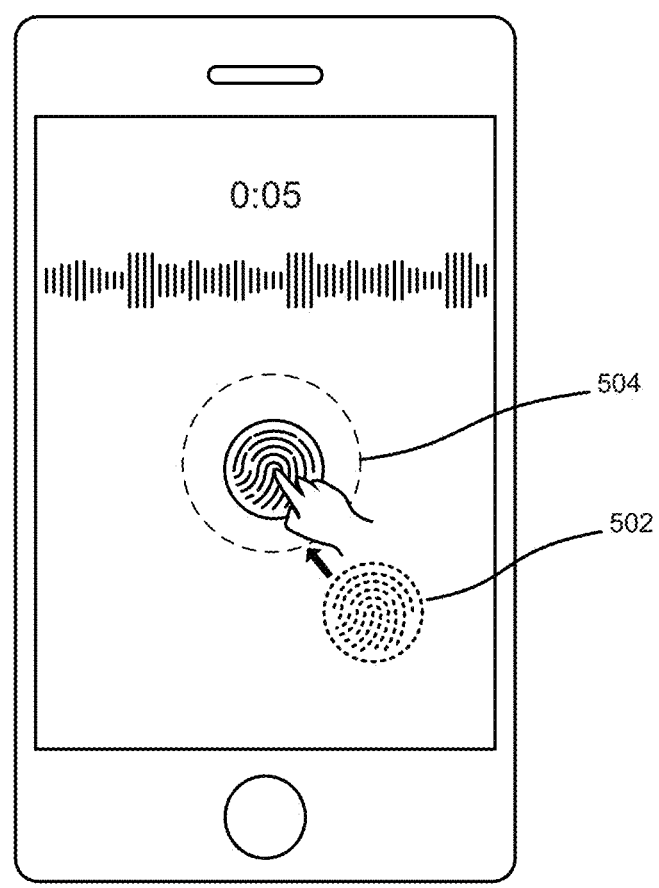
FIG. 5 illustrates an exemplary user verification operation based on dragging an icon to a preset target location, in accordance with an embodiment of the present invention.

FIG. 5 illustrates an exemplary user verification operation based on dragging an icon to a preset target location, in accordance with an embodiment of the present invention. The target location can be a fixed position on the current page, for example, the preset area marked by circular dotted line 504. When icon 502 is dragged to preset area 504 (e.g., partially or fully entering area 504), the system can consider the preset icon to be dragged to the target location, thereby confirming recording and/or transmission of the message. With the preset area in a fixed position, the verification condition to determine user intent can be relatively stringent, reducing the probability of false verification.

Alternatively, in some embodiments, the system may display preset icon 502 where the user triggering operation occurs, and locate preset verification area 504 relative to preset icon 502 (e.g., near icon 502). Such an arrangement can improve expediency, reduce complexity, and minimize disruption of the user's normal operation, e.g. by facilitating continuity of the triggering and verification operations. For example, because icon 502 is displayed where triggering occurs, the user can continue directly from triggering to dragging icon 502 to location 504, without lifting his or her finger. Likewise, when the preset verification area is located near preset icon 502, the user only needs to drag icon 402 a conveniently short distance.

Preventing Unintentional Transmission

In some embodiments of the present invention, if the user does not carry out both the triggering and verification operations, a message will not be sent. Note that, as described above, the system can adopt different user operations (possibly chosen by the user) as the triggering and verification operations. For example, the triggering operation could be configured as a screen press operation, whereas verification is a sliding operation. In this embodiment, if accidental touching occurs, it can only correspond at most to a single user operation. The user triggering and verification operations will not both coincide with a single accidental touching event, and the system thus prevents unintentional sending of the multimedia message.

By contrast, in existing systems, voice acquisition only requires one user operation—or at most one type of user operation. For example, referring back to FIG. 1A, in existing systems, voice acquisition can be triggered when a user presses microphone icon 104 or voice acquisition function button 110, and sending is confirmed when the user releases button 110. As a result, existing systems would record and send a multimedia message if a user accidentally presses his or her device, and subsequently releases contact with the device, whether intentionally or not.

By contrast with this existing "release to send and slide up to cancel" configuration, the present system can instead employ a "drag to send and release to cancel" configuration. In fact, consider that by replacing the "release to send" configuration with a "drag to send" configuration, the system can improve reliability and minimize unwanted transmission. By the same token, by replacing "slide up to cancel" with "release to cancel," the system simplifies operational complexity in order to cancel transmission, thereby enhancing user experience.

Note also that a qualitative difference between the triggering operation and verification operation, safeguards against inadvertent sending. Moreover, accidental touching is typically a sudden incident (e.g., the user brushes the device inadvertently during movement). Therefore, by keeping the triggering and verification operations continuous, longer, and less likely to occur accidentally, the system can effectively prevent such problems. Clearly, the disclosed system and methods provide improved identification of the user's actual intention, while acquiring multimedia messages in accordance with the user's actual preferences, and avoiding erroneously sending spuriously recorded messages.

Verifying Message Sending Based on Long-Pressing a Region

In some embodiments, the present invention may preferably employ long-pressing in an empty region as the user's triggering operation, and dragging of a preset icon as the verification operation. Such operations can demarcate the user's intention especially reliably, so as to prevent unintentional recording and transmission. Yet these operations also provide especially convenient and expeditious operation to the user, in particular allowing the user to perform both operations in a single continuous motion.

Figure 6:
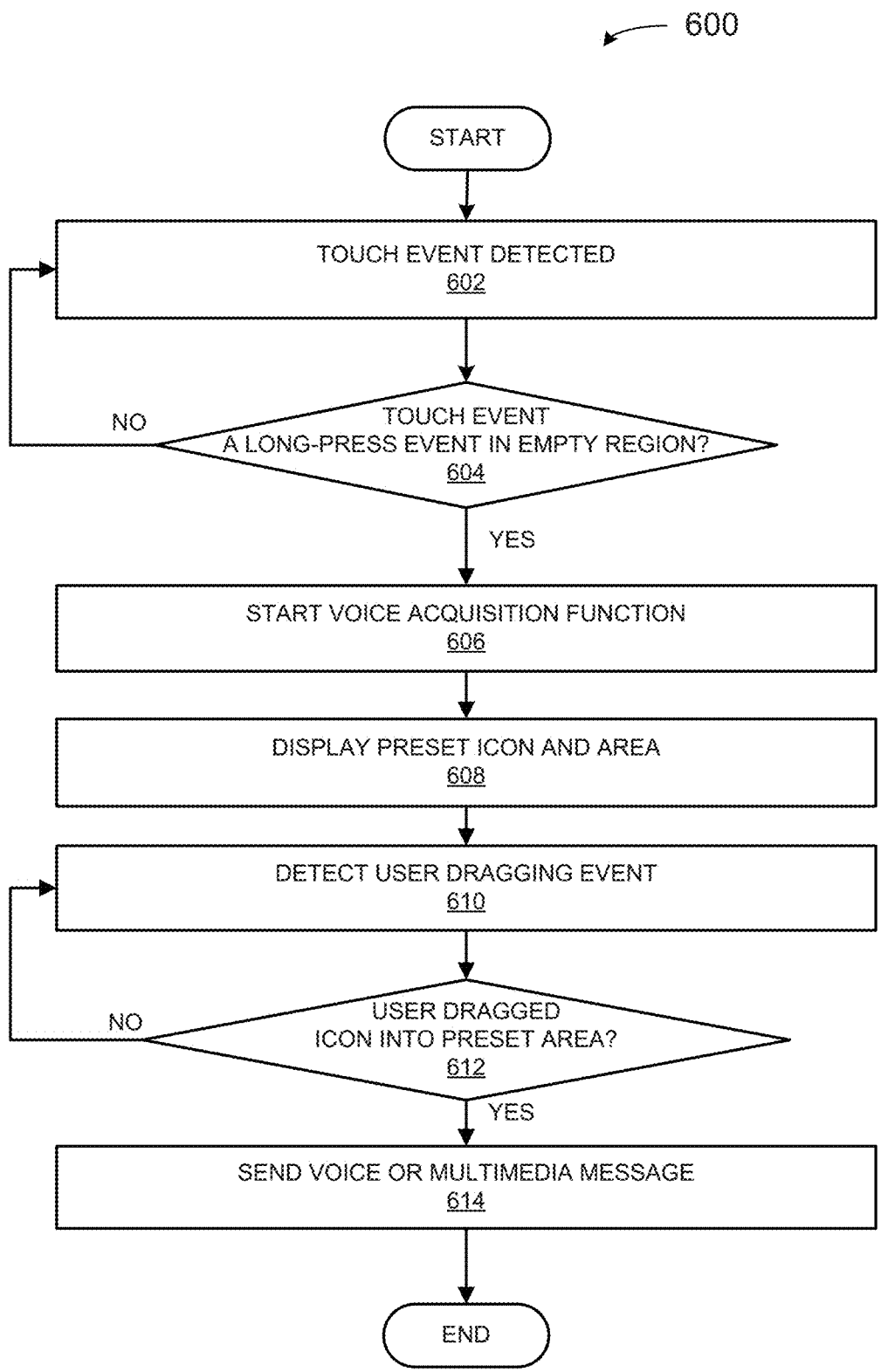
FIG. 6 presents a flowchart illustrating a method for verifying sending of a voice or multimedia message by long-pressing an empty region of a window, in accordance with an embodiment of the present invention.

Here we consider in detail the system's operation in such embodiments. FIG. 6 presents a flowchart illustrating a method 600 for verifying sending of a voice or multimedia message by long-pressing an empty region of a window, in accordance with an embodiment of the present invention. In these embodiments, the system first detects a touch event (operation 602). The system then determines whether the touch event is a long-press event in an empty region of the current display (operation 604). That is, the system checks for a user's long-press in a region of the screen not containing any messages (including words, pictures, voice and emoticons). Note that step 604 coincides with step 302 of method 300, detecting the user triggering operation. A person skilled in the art will appreciate that the long-press operation discussed here is exemplary, and that the user triggering operation may be another operation such as those listed in Table 1, or any other operation, not limited by the present invention.

In response to detecting the long-press event in an empty region, the system can initiate the voice, video, or multimedia acquisition function (operation 606). The system then displays a preset icon and preset area (operation 608). The system may then detect a user dragging event (operation 610), and check whether the user has dragged the preset icon into the preset area (operation 612).

Here, a user dragging or sliding event can correspond to sliding of the user's finger, in contact with the preset icon, while the device displays the icon sliding synchronously with the touch point on the screen. A person skilled in the art will appreciate that dragging to the preset area is presented here as an exemplary operation, and the user verification operation may be any other operation. For example, the verification operation could include a thumb trace in an arc according to a minimum or maximum angular displacement, an operation the user can perform while holding the device with a single hand.

In some embodiments, the system may record the voice or multimedia message during active user triggering, and stop recording when the user ceases the triggering operation. Optionally, where the triggering operation is continuous with verification, if the user's finger remains in contact with the device without sliding, recording can continue; alternatively, if the user's finger slides or lifts from the device, recording can be stopped. In addition, in embodiments where triggering is continuous with verification, the system can continue recording until the user completes the verification operation (e.g., the icon dragging behavior), and then cease. This can allow the user to continue recording a message even in the case of beginning to slide the icon accidentally.

In some embodiments, the system can preview the message for the user. If the system detects the user's predefined preview operation, the system can stop recording, and play back the message (e.g., through the device's built-in loudspeaker and display, or an external headset), so the user can decide whether to confirm sending. For example, as shown in FIG. 5, the user verification operation is dragging icon 502 upward to preset area 504, the user preview operation may be dragging icon 502 downward a preset distance. The user preview operation can also be any other gesture, such as those listed in Table 1, that is distinct from the triggering and verification operations. In some embodiments, the system may automatically preview the message when recording completes. Consider that, even if transmission in existing systems can be canceled, the user may still be unable to determine whether he or she is satisfied with the current voice message. By virtue of previewing, the user can choose whether to send the message, improving usability. Moreover, if the message is long, the user may avoid canceling an actually satisfactory message, thus improving recording efficiency.

In some embodiments, when starting or ceasing recording, the system can execute an auxiliary reminder operation to notify the user of the change in state. For example, the reminder can include: playback of preset reminder audio, device vibration, flashing LED or light, device display flicker (e.g., suddenly adjusting to maximum brightness and maintaining for 0.5 seconds before restoring to initial brightness), and any other reminder operation.

Referring back to FIG. 6, in response to determining the preset icon has been dragged into the preset area, the system can send the voice or multimedia message (operation 614). By differentiating between the start of the voice acquisition function and the transmission of the message, the system uses the verification operation to determine whether actually to send the acquired message.

In some embodiments, the system can automatically determine the recipient or target object for the message. For example, when the user triggering operation occurs in an empty region of a communication session window, the recipient with whom the user corresponds in that communication session can be taken as the target object. Similar configurations can be implemented for group chats with multiple recipients.

Figure 7:
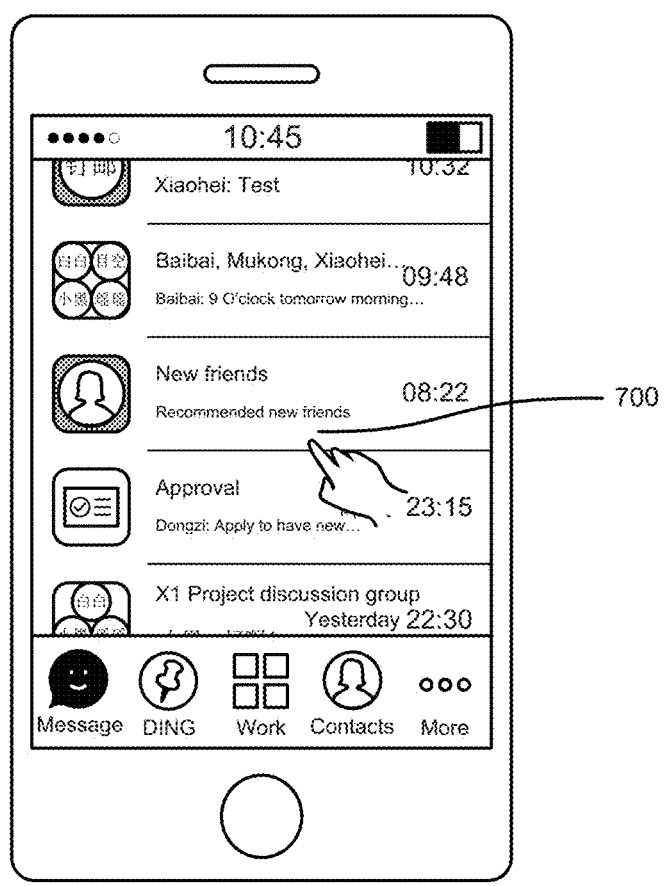
FIG. 7 illustrates triggering recording of a voice or multimedia message by long-pressing an empty region of a message list window, in accordance with an embodiment of the present invention.

Note that in some embodiments, the system can also allow triggering in a non-communication session window. Such direct triggering may enhance usability by providing the user a shortcut to recording without the need to enter into a communication application first. In some embodiments, such a direct triggering option may be user-configurable. FIG. 7 illustrates triggering recording of a voice or multimedia message by long-pressing an empty region 700 of a message list window, in accordance with an embodiment of the present invention. If the user long-presses empty region 700 in a non-communication session window, as in FIG. 7, the system may still determine that triggering has occurred, and initiate recording.

Figure 8:
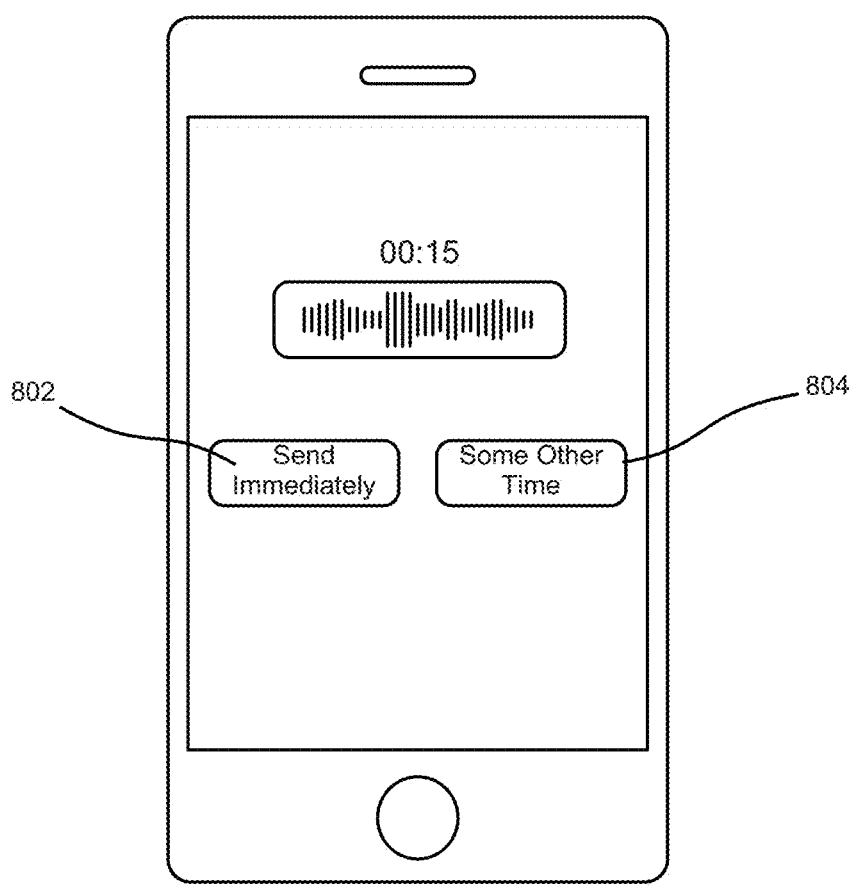
FIG. 8 illustrates an exemplary page for verifying sending of a voice or multimedia message, in accordance with an embodiment of the present invention.

FIG. 8 illustrates an exemplary page for verifying sending of a voice or multimedia message, in accordance with an embodiment of the present invention. After acquisition of the message is stopped, as shown, the system may present a variety of options to the user. When the user selects the "Send Immediately" option 802, the system can select a target for sending, e.g. by taking a recipient of the selected communication session window as the target object. When the user instead selects option "Some Other Time" 804, the system need not immediately determine a target, and can instead cache the acquired message. In some embodiments, the user can instruct the system to cache the message by performing another gesture, such as those listed in Table 1. The user can then view, delete, and send the cached message at any time (or, in some embodiments, within a certain period of time) and choose a recipient at the time of sending.

In some embodiments, the system may automatically determine the recipient when sending the cached messages. The system can also cache messages that have already been sent, and the user can resend such cached messages to any target objects, including ones other than the original recipient. Furthermore, the user can replay cached messages, e.g. before deciding to send.

Verifying Sending within an Instant Messaging Application

Figure 9:
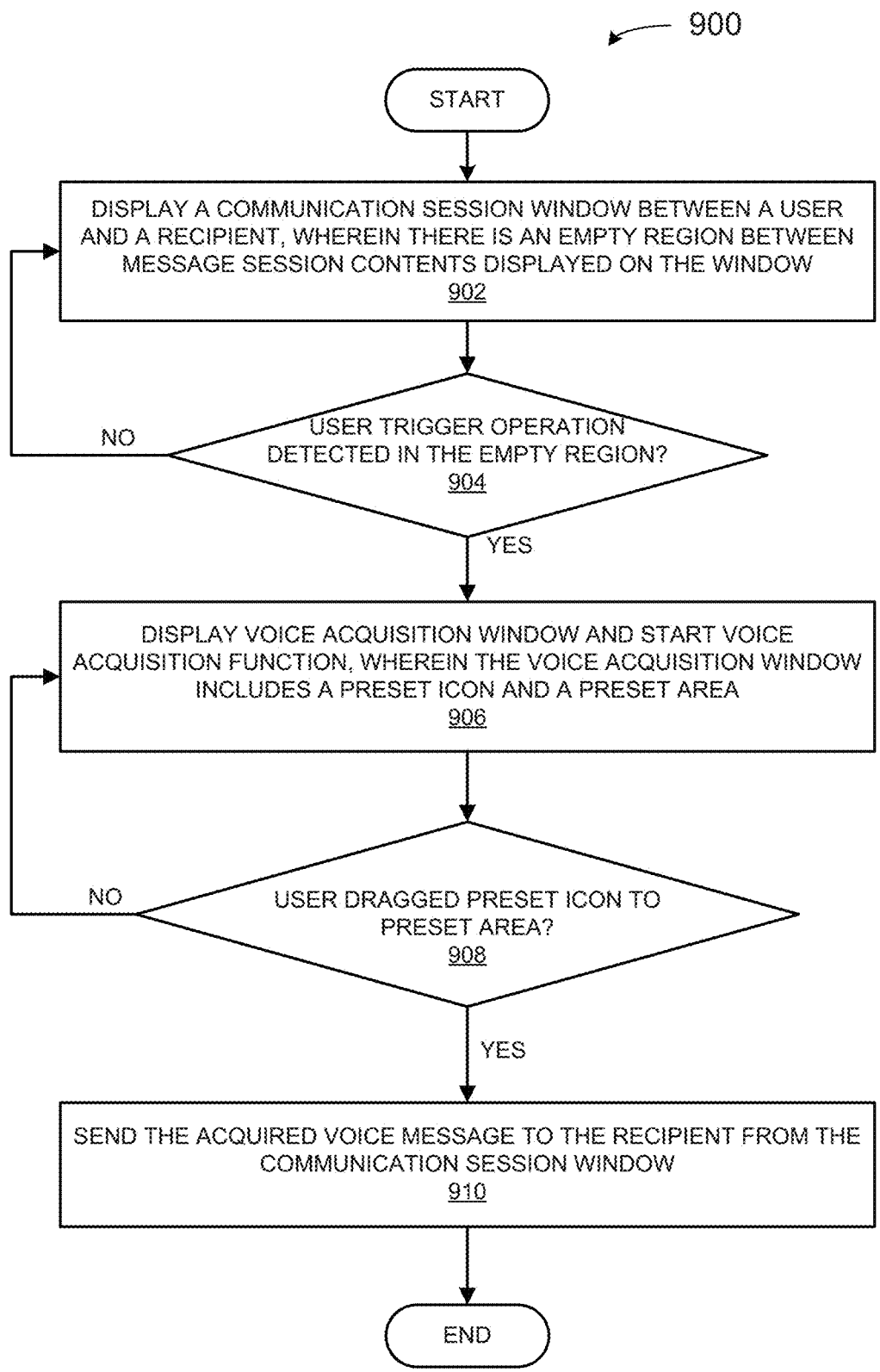
FIG. 9 presents a flowchart illustrating a method for verifying sending of a voice or multimedia message within an instant messaging application, in accordance with an embodiment of the present invention.

FIG. 9 presents a flowchart illustrating a method 900 for verifying sending of a voice or multimedia message within an instant messaging application, in accordance with an embodiment of the present invention. During operation, the system can display a communication session window between a user and a recipient, wherein there is an empty region between message session contents displayed on the window (operation 902). The system then checks whether a user trigger operation is detected in the empty region (operation 904). Responsive to detecting the user trigger operation, the system then displays a voice or multimedia acquisition window and starts the voice or multimedia acquisition function, wherein the voice or multimedia acquisition window can include a preset icon and preset trigger area (operation 906). The system then checks whether the user has dragged the preset icon to the preset trigger area (operation 908). Responsive to detecting the user has dragged the preset icon to the preset area, the system then sends the acquired voice or multimedia message to the recipient from the communication session window (operation 910), or to a recipient determined by another method, as described above.

Exemplary Embodiments

One embodiment of the present invention provides a system and method for verifying sending of a voice or multimedia message. During operation, the system receives a first operation representing an instruction to allow a voice or multimedia message to be generated. The system then records the voice or multimedia message. Subsequently, the system receives a second operation. In response to determining that the second operation corresponds to a verification instruction to allow the voice or multimedia message to be sent, the system sends the voice or multimedia message to a second user or group.

In a variation on this embodiment, the first operation comprises a first touch operation of the user, and the second predefined trigger operation comprises a second touch operation of the user.

In a variation on this embodiment, the first operation and the second operation each comprise one or more of: a tap or press operation; a two-finger tap operation; a long press operation; a finger release operation; a sliding operation; a dragging operation; a dragging operation to a target location; a thumb trace operation; a pinch gesture operation; a pan gesture operation; and a zoom gesture operation.

In a variation on this embodiment, the first operation includes a long-press touch operation in an empty region unoccupied by any message within a communication session window.

In a variation on this embodiment, determining that the second operation corresponds to the verification instruction includes determining whether an icon object has been moved from a first position to a second position.

In a variation on this embodiment, the second operation is continuous with the first predefined trigger operation.

In a variation on this embodiment, the system further displays an icon to prompt the user for one or more of: beginning to record the voice or multimedia message; finishing to record the voice or multimedia message; and sending the voice or multimedia message.

In a variation on this embodiment, the system further generates an auxiliary voice or vibration prompt to inform the user of one or more of: beginning to record the voice or multimedia message; finishing to record the voice or multimedia message; and sending the voice or multimedia message.

In a variation on this embodiment, the system verifies sending of the voice or multimedia message within an instant messaging (IM) or enterprise instant messaging (EIM) application.

Exemplary Computer System

Figure 10:
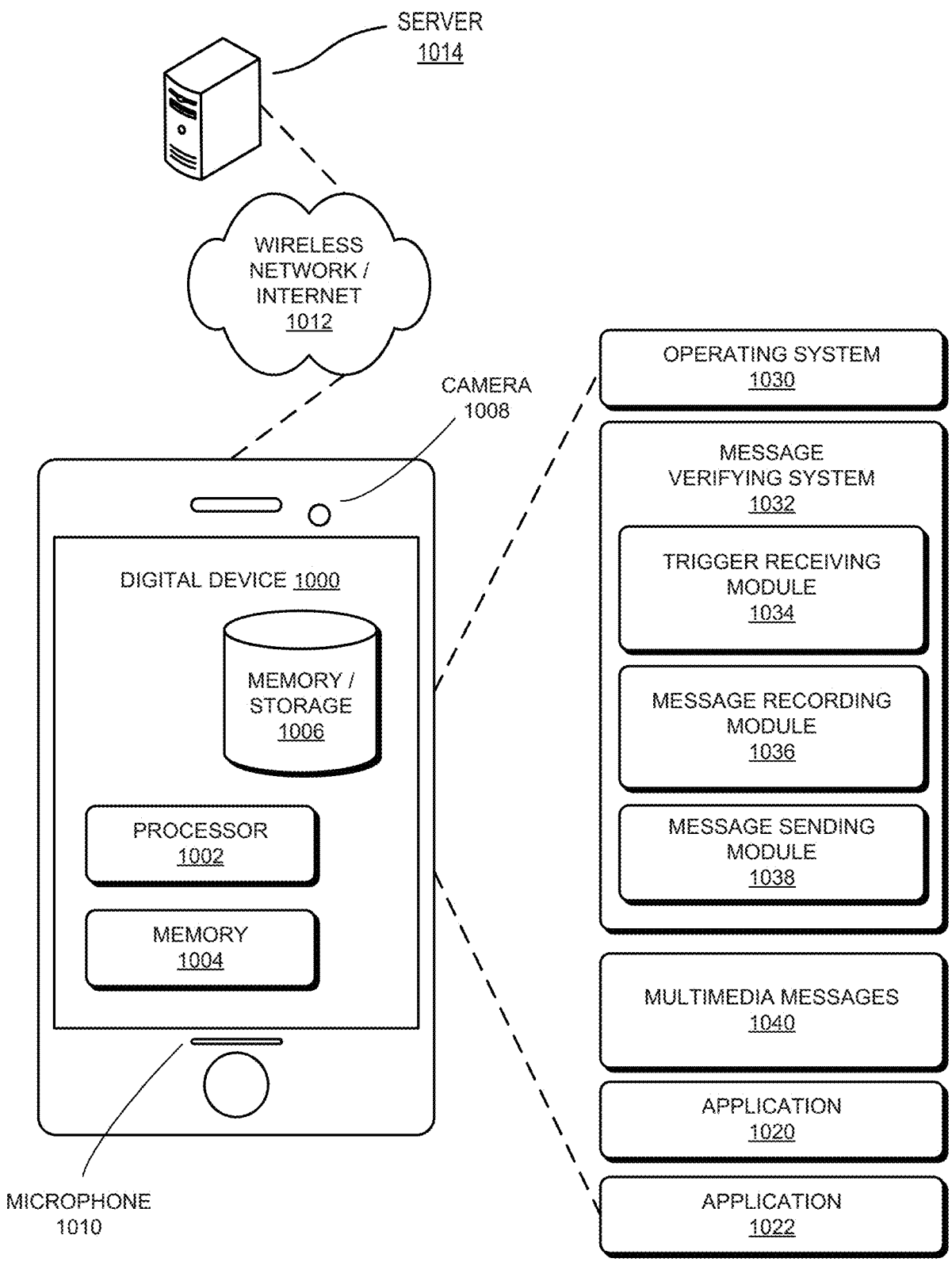
FIG. 10 presents a block diagram illustrating an exemplary system for verifying sending of a voice or multimedia message, according to embodiments of the present invention.
In the figures, like reference numerals refer to the same figure elements.

FIG. 10 presents a block diagram illustrating an exemplary system or digital device for verifying sending of a voice or multimedia message, according to embodiments of the present invention. In FIG. 10, digital device 1000 includes one or more processors 1002, a memory 1004, and a storage device or solid-state non-volatile memory 1006. Storage device 1006 typically stores instructions that can be loaded into memory 1004 and executed by processor 1002 to perform the methods mentioned above. As a result, system 1000 can perform the functions described above. Digital device 1000 can also include camera 1008 and microphone 1010, which can be used to record voice and/or multimedia messages, according to embodiments of the present invention. Digital device 1000 may also be coupled via one or more network interfaces to one or more networks. Specifically, device 1000 may be connected to local network, wireless network, or internet 1012, and may communicate with server 1014 via such a network. In some embodiments, server 1014 can perform some functions of the present invention, for example transmitting or serving up recorded voice and/or multimedia messages.

In one embodiment, processor 1002 can execute instructions in storage device 1006 in order to implement operating system 1030 and message verifying system 1032, which can comprise various modules. In one embodiment, instructions in storage device 1006 can implement a trigger receiving module 1034, a message recording module 1036, and a message sending module 1038.

Trigger receiving module 1034 can obtain instructions to receive the user triggering operation, which may include a first touch behavior. Message recording module 1036 may record a voice, video, or multimedia message. Message sending module 1038 may add the target user as a recipient of the alert.

In some embodiments, modules 1034, 1036, and 1038 can be partially or entirely implemented in hardware and can be part of processor 1002. Further, in some embodiments, the system may not include a separate processor and memory. Instead, in addition to performing their specific tasks, modules 1034, 1036, and 1038, either separately or in concert, may be part of general- or special-purpose computation engines.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executed method for verifying sending of voice messages, comprising:
   displaying, by a mobile computing device on a touch-screen display, a message-list user interface comprising a list of previously sent messages;
   detecting, by the mobile computing device, a first operation of a user on the touchscreen display, wherein the first operation comprises contacting a first empty region positioned between two adjacent entries of the list of previously sent messages;

in response to detecting the user contacting the first empty region positioned between the two adjacent entries of the list of previously sent messages, displaying, on the touchscreen display, a voice-acquisition user interface on top of the message-list user interface, wherein the voice-acquisition user interface replaces the list of previously sent messages and displays an icon corresponding to the first empty region and a target area corresponding to a second empty region on the touch screen display while recording a voice message from the user, wherein the second empty region is different from the first empty region; and in response to detecting, by the mobile computing device, a second operation of the user on the touchscreen display that drags the displayed icon to the target area, sending the recorded voice message to a second user or group.

2. The method of claim 1, wherein the first operation and the second operation each comprise one or more of:
- a tap or press operation;
- a two-finger tap operation;
- a long press operation;
- a finger release operation;
- a sliding operation;
- a dragging operation;
- a thumb trace operation;
- a pinch gesture operation;
- a pan gesture operation; and
- a zoom gesture operation.

3. The method of claim 1, wherein the first operation comprises a long-press touch operation, and wherein the first empty region is unoccupied by any entry within a non-communication session window comprising the list of previously sent messages prior to the user performing the first operation.

4. The method of claim 1, further comprising determining that the second operation corresponds to a verification instruction that allows the voice message to be sent.

5. The method of claim 1, wherein the second operation is continuous with the first operation.

6. The method of claim 1, further comprising displaying an icon to prompt the user for one or more of:
- beginning to record the voice message;
- finishing to record the voice message; and
- sending the voice message.

7. The method of claim 1, further comprising generating an auxiliary voice or vibration prompt to inform the user of one or more of:
- beginning to record the voice message;
- finishing to record the voice message; and
- sending the voice message.

8. The method of claim 1, wherein the method is performed within an instant messaging (IM) or enterprise instant messaging (EIM) application.

9. A non-transitory computer-readable storage medium storing instructions that, when executed by a computer, cause the computer to perform a method for verifying sending of voice messages, the method comprising:
displaying, by a mobile computing device on a touchscreen display, a message-list user interface comprising a list of previously sent messages;
detecting, by the mobile computing device, a first operation of a user on the touchscreen display, wherein the first operation comprises contacting a first empty region positioned between two adjacent entries of the list of previously sent messages;

in response to detecting the user contacting the first empty region positioned between the two adjacent entries of the list of previously sent messages, displaying, on the touchscreen display, a voice-acquisition user interface on top of the message-list user interface, wherein the voice-acquisition user interface replaces the list of previously sent messages and displays an icon corresponding to the first empty region and a target area corresponding to a second empty region on the touch screen display while recording a voice message from the user, wherein the second empty region is different from the first empty region; and in response to detecting, by the mobile computing device, a second operation of the user on the touchscreen display that drags the displayed icon to the target area, sending the recorded voice message to a second user or group.

10. The non-transitory computer-readable storage medium of claim 9, wherein the first operation and the second operation each comprise one or more of:
- a tap or press operation;
- a two-finger tap operation;
- a long press operation;
- a finger release operation;
- a sliding operation;
- a dragging operation;
- a thumb trace operation;
- a pinch gesture operation;
- a pan gesture operation; and
- a zoom gesture operation.

11. The non-transitory computer-readable storage medium of claim 9, wherein the first operation comprises a long-press touch operation, and wherein the first empty region is unoccupied by any entry within a non-communication session window comprising the list of previously sent messages prior to the user performing the first operation.

12. The non-transitory computer-readable storage medium of claim 9, wherein the method further comprises determining that the second operation corresponds to a verification instruction that allows the voice or multimedia message to be sent.

13. The non-transitory computer-readable storage medium of claim 9, wherein the second operation is continuous with the first operation.

14. The non-transitory computer-readable storage medium of claim 9, wherein the method further comprises displaying an icon to prompt the user for one or more of:
- beginning to record the voice message;
- finishing to record the voice message; and
- sending the voice message.

15. The non-transitory computer-readable storage medium of claim 9, wherein the method further comprises generating an auxiliary voice or vibration prompt to inform the user of one or more of:
- beginning to record the voice message;
- finishing to record the voice message; and
- sending the voice message.

16. A computing system for verifying sending of voice messages, the system comprising:
a set of processors; and
a non-transitory computer-readable medium coupled to the set of processors storing instructions thereon that, when executed by the processors, cause the processors to perform a method for verifying sending of a voice message, the method comprising:
- displaying, by a mobile computing device on a touchscreen display, a message-list user interface comprising a list of previously sent messages;
- detecting, by the mobile computing device, a first operation of a user on the touchscreen display, wherein the first operation comprises contacting a first empty region positioned between two adjacent entries of the list of previously sent messages;
- in response to detecting the user contacting the first empty region positioned between the two adjacent entries of the list of previously sent messages, displaying, on the touchscreen display, a voice-acquisition user interface on top of the message-list user interface, wherein the voice-acquisition user interface replaces the list of previously sent messages and displays an icon corresponding to the first empty region and a target area corresponding to a second empty region on the touch screen display while recording a voice message from the user, wherein the second empty region is different from the first empty region; and
- in response to detecting, by the mobile computing device, a second operation of the user on the touchscreen display that drags the displayed icon to the target area, sending the recorded voice message to a second user or group.

17. The computing system of claim 16, wherein the first operation and the second operation each comprise one or more of:
- a tap or press operation;
- a two-finger tap operation;
- a long press operation;
- a finger release operation;
- a sliding operation;
- a dragging operation;
- a thumb trace operation;
- a pinch gesture operation;
- a pan gesture operation; and
- a zoom gesture operation.

18. The computing system of claim 16, wherein the first operation comprises a long-press touch operation, and wherein the first empty region was unoccupied by any entry within a non-communication session window comprising the list of previously sent messages prior to the user performing the first operation.

19. The computing system of claim 16, wherein the method further comprises determining that the second operation corresponds to a verification instruction that allows the voice message to be sent.

20. The computing system of claim 16, wherein the second operation is continuous with the first operation.

* * * * *